(12) United States Patent
Mabe et al.

(10) Patent No.: US 10,054,047 B2
(45) Date of Patent: Aug. 21, 2018

(54) AIRCRAFT THERMAL ENERGY HARVESTING USING ROTARY SHAPE MEMORY ALLOY APPARATUS

(71) Applicant: The Boeing Company, Chicago, IL (US)

(72) Inventors: James H. Mabe, Kirkwood, MO (US); Naveed M. Hussain, Palos Verdes Peninsula, CA (US); Edward A. Whalen, Webster Groves, MO (US); Frederick T. Calkins, Renton, WA (US)

(73) Assignee: The Boeing Company, Chicago, IL (US)

( * ) Notice: Subject to any disclaimer, the term of this patent is extended or adjusted under 35 U.S.C. 154(b) by 13 days.

(21) Appl. No.: 15/233,685

(22) Filed: Aug. 10, 2016

(65) Prior Publication Data
US 2016/0348580 A1   Dec. 1, 2016

Related U.S. Application Data

(63) Continuation-in-part of application No. 14/566,376, filed on Dec. 10, 2014, now Pat. No. 9,885,345.

(51) Int. Cl.
*F02C 6/04* (2006.01)
*F03G 7/06* (2006.01)

(52) U.S. Cl.
CPC ............... *F02C 6/04* (2013.01); *F03G 7/065* (2013.01)

(58) Field of Classification Search
CPC .................. F02G 1/043; F03G 7/065

USPC .................................................. 60/526–529
See application file for complete search history.

(56) References Cited

U.S. PATENT DOCUMENTS

| | | | | |
|---|---|---|---|---|
| 3,937,019 A * | 2/1976 | Renner | ............... | F03G 7/065 60/527 |
| 4,086,769 A * | 5/1978 | Smith | ............... | F03G 7/065 60/527 |
| 4,393,654 A * | 7/1983 | Pelly | ............... | F03G 7/065 60/527 |
| 4,841,730 A * | 6/1989 | McDonald | ............... | F03G 7/065 60/527 |
| 5,127,228 A * | 7/1992 | Swenson | ............... | F03G 7/065 60/527 |
| 5,279,123 A * | 1/1994 | Wechsler | ............... | F03G 7/065 60/527 |
| 5,645,520 A * | 7/1997 | Nakamura | ............... | A61B 1/0058 600/143 |
| 5,975,468 A * | 11/1999 | Moignier | ............... | F03G 7/065 244/172.7 |

(Continued)

*Primary Examiner* — Mark Laurenzi
*Assistant Examiner* — Shafiq Mian
(74) *Attorney, Agent, or Firm* — Fleix L. Fischer

(57) ABSTRACT

A thermal energy harvesting system employs a hot flow conduit and a cold flow conduit with a flow routing device interruptibly interconnecting the hot flow conduit and cold flow conduit with a flow casing. At least one shape memory actuator (SMA) tube is in fluid contact with the flow casing and fixed at a first end. The flow routing device sequentially supplies hot flow from the hot flow conduit and cold flow from the cold flow conduit inducing rotation of the at least one SMA tube at a second end. A generator or alternator is operably connected to the second end of the at least one SMA tube.

18 Claims, 15 Drawing Sheets

(56) References Cited

U.S. PATENT DOCUMENTS

| | | | | |
|---|---|---|---|---|
| 6,367,250 | B1 * | 4/2002 | Baumbick | F01D 17/20 137/625.62 |
| 7,037,076 | B2 * | 5/2006 | Jacot | F03G 7/065 416/155 |
| 7,688,168 | B2 * | 3/2010 | Taya | F04B 9/06 310/26 |
| 7,878,459 | B2 | 2/2011 | Mabe et al. | |
| 7,918,789 | B2 * | 4/2011 | Abadie | A61B 1/0058 348/76 |
| 8,118,264 | B2 | 2/2012 | Mabe et al. | |
| 8,499,913 | B2 * | 8/2013 | Gunter | B64C 13/50 192/12 B |
| 8,607,562 | B2 * | 12/2013 | Browne | F03G 7/065 60/527 |
| 8,661,810 | B2 * | 3/2014 | Browne | F03G 7/065 60/529 |
| 8,726,653 | B2 * | 5/2014 | Tice | F25D 3/00 60/527 |
| 9,010,106 | B2 * | 4/2015 | Jardine | F03G 7/065 60/527 |
| 2003/0053912 | A1 * | 3/2003 | Jacot | F03G 7/065 416/30 |
| 2007/0119165 | A1 * | 5/2007 | Yson | F03G 7/065 60/527 |
| 2010/0102093 | A1 * | 4/2010 | Ham | B05B 17/0607 239/101 |
| 2011/0179790 | A1 * | 7/2011 | Pretorius | F03G 7/065 60/641.15 |
| 2012/0292155 | A1 * | 11/2012 | Gunter | B64C 13/50 192/82 T |
| 2013/0000206 | A1 * | 1/2013 | O'Kane | G12B 1/02 49/472 |
| 2013/0160445 | A1 * | 6/2013 | Olson | F16K 31/002 60/527 |

* cited by examiner

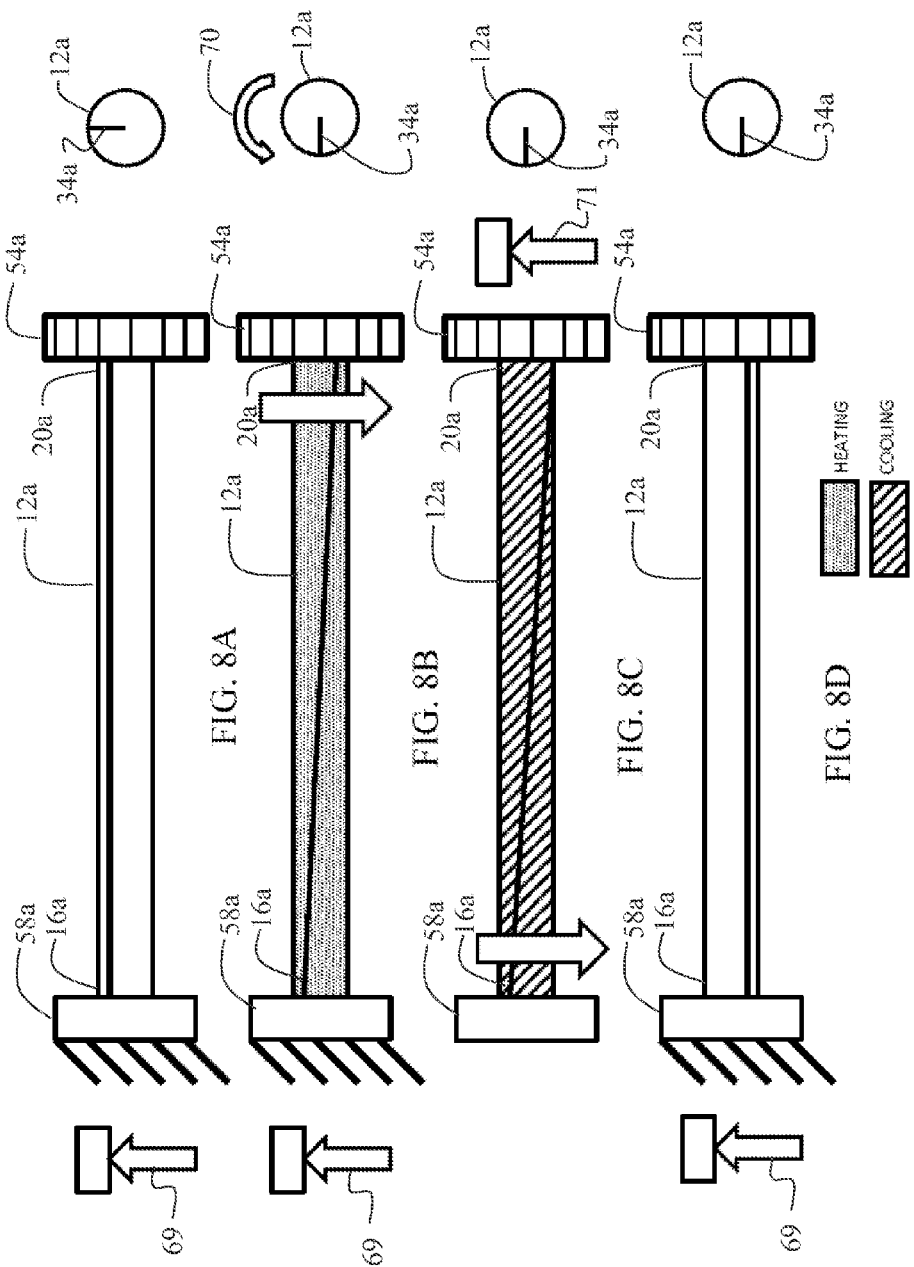

US 10,054,047 B2

AIRCRAFT THERMAL ENERGY HARVESTING USING ROTARY SHAPE MEMORY ALLOY APPARATUS

REFERENCES TO RELATED APPLICATIONS

This application is a continuation-in-part of application Ser. No. 14/566,376 filed on Dec. 10, 2014 entitled SCALABLE MULTI-ELEMENT SHAPE MEMORY ALLOY ROTARY MOTOR now issued as U.S. Pat. No. 9,885,345 having a common assignee with the present application, the disclosure of which is incorporated herein by reference.

BACKGROUND INFORMATION

Field

Embodiments of the disclosure relate generally to thermal energy harvesting for electrical power and more particularly to a system employing alternating flow control of hot and cold air streams through a shape memory alloy (SMA) tube providing rotation to an output shaft connected to a generator.

Background

There is a growing need for electrical power on modern aircraft. Everything from flight control surfaces to entertainment systems require more and more electrical power. At the same time, in the face of increasing demands for reduced emissions, engines are becoming more and more efficient and therefore have much less excess power available to be used for generating electrical power. Additionally the large number of electrical systems on modern aircraft also requires a significant amount of heavy and complex wiring. Existing methods for supplying energy to electrically powered systems, such as the environmental control system (ECS), rely exclusively on power generated by the engines or auxiliary power unit (APU). Ground power may be used for ground operations, however in flight electrical power is provided by the increasingly taxed engines.

Shape memory actuator (SMA) systems have been employed in the prior art for energy harvesting by converting thermal energy to motion which is then employed for electrical energy generation. Typical prior art systems usually rely on two separated and stationary hot and cold zones and use a complex kinematic device that is powered by the shape change of the SMA component. As an SMA element heats up it literally moves itself out of the hot zone and into the cool zone, as it cools the subsequent shape change moves it back to the hot zone where the process is repeated. These methods often produce large motions, but very little work and only small amounts of electrical power are generated.

It is therefore desirable to provide an efficient system for energy harvesting which can provide local power to reduce wiring runs and supplement engine and APU power.

SUMMARY

Exemplary embodiments provide a thermal energy harvesting system having a hot flow conduit and a cold flow conduit with a flow routing device interruptibly interconnecting the hot flow conduit and cold flow conduit with a flow casing. At least one shape memory actuator (SMA) tube is in fluid contact with the flow casing and fixed at a first end. The flow routing device sequentially supplies hot flow from the hot flow conduit and cold flow from the cold flow conduit inducing rotation of the at least one SMA tube at a second end. A generator or alternator is operably connected to the second end of the at least one SMA tube.

The embodiments disclosed provide a method for thermal energy harvesting by training at least one shape memory actuator (SMA) tube with a twist direction. The at least one SMA tube is constrained at a first end and a second end of the at least one SMA tube is supported with a bearing. The second end of the SMA tube is rotated to drive a generator/alternator through a gear box.

BRIEF DESCRIPTION OF THE DRAWINGS

The features, functions, and advantages that have been discussed can be achieved independently in various embodiments of the present disclosure or may be combined in yet other embodiments, further details of which can be seen with reference to the following description and drawings.

FIGS. 8A-8D demonstrate the operating sequence of an exemplary SMA tube and associated ratchet or sprag gear employed by the second embodiment;

DETAILED DESCRIPTION

The embodiments and methods described herein provide a lightweight, compact, and rugged thermal energy harvesting system that will employ the available thermal energy in the Environmental Control System (ECS) of an aircraft and convert it into electrical energy. While described herein for use with respect to an aircraft, the embodiments disclosed herein are equally applicable to any vehicle, vessel or system having heat generating systems with available excess waste heat as a hot flow source and availability of a cold flow source. The electrical energy produced by the disclosed embodiments can be used to locally power the ECS at cruise conditions and can also generate extra power to be stored for use by the system on the ground, eliminating significant wire runs. An exemplary disclosed embodiment employs a stationary SMA tube that twists when it is heated and cooled. The tube is fixed at one end and allowed to rotate at the other. As the tube twists actuating air flowing around the tube is controlled by a flow routing device such as a baffle plate or valves operably connected to the tube, cycling between available hot and cold air flows extracted from the ECS such as hot engine bypass air and cold free stream air. As the SMA tube heats up, the baffle plate is rotated. When the tube reaches a rotated position based on a predefined hot temperature the baffle plate blocks the hot engine bypass air and opens up the cold free stream air flow. As the tube cools, the baffle plate rotates back and eventually the SMA tube reaches its fully cool rotation angle, the baffle plate closes off the cold flow and opens the hot flow and the process repeats. In alternative embodiments, control of the hot and cold air flow may be accomplished with solenoid valves controlled by rotational position of the tube. The SMA tube can generate significant torque, much higher that any known wire or spring designs. The large torque is geared in exemplary embodiments producing a very high RPM output to drive an electrical generator. Alternative embodiments incorporate multiple tubes for larger force or more rotation. Multiple tubes that use latching or ratcheting mechanisms are employed to produce rotation in just one direction. Flow paths that direct the heating and cooling air flow down the center of the SMA tube may be employed to eliminating some tubing or contained volume, reducing the weight, and increasing the multifunctional nature of the apparatus.

Figure 1A:
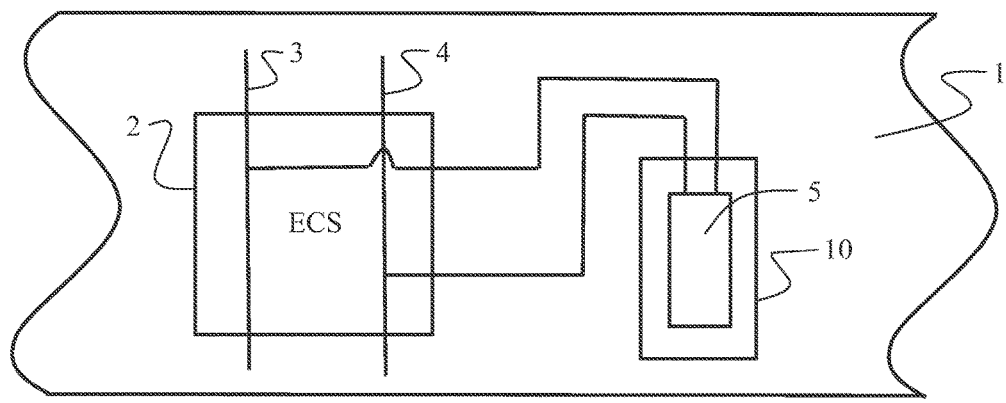
FIG. 1A is a schematic block diagram of an aircraft employing a thermal energy harvesting system as disclosed herein.
Figure 1B:
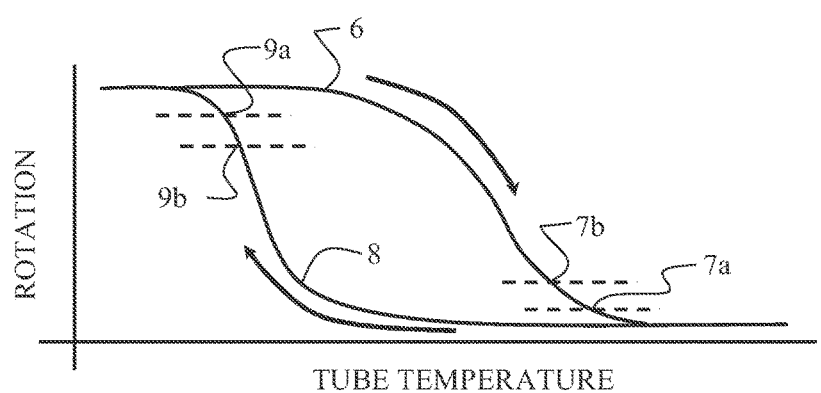
FIG. 1B is a graph demonstrating SMA tube rotation based on temperature.

Referring to the drawings, a thermal energy harvesting system 10 for use in an aircraft is shown in FIG. 1A. An ECS 2 or other similar system in an aircraft 1 receives hot bypass airflow 3 from an engine or APU of the aircraft and cold airflow 4 from the air free stream around the aircraft through a heat exchanger or other means. Hot air and cold air extracted from the ECS are supplied to a SMA rotary motion generator 5 employing one or more SMA tubes. The amount of rotation of an SMA tube is a function of the length and outer diameter of the tube. The amount of force generated by the tube is a function of the outer diameter (OD) and wall thickness of the tube. The temperature at which the SMA tube rotates is a function of the alloy and the processing of the alloy. As seen in FIG. 1B, the zones at which the hot and cold air flows around the tube would be switched are shown. Hot flow would pass over the tube as shown in trace segment 6 until it reaches a point 7a near the maximum hot rotation. The hot flow is then shut off and the cold flow would be opened as shown in trace segment 8. The cold flow passes around the tube until the tube reaches a point 9a near its minimum cold actuation temperature and then the cold flow would be shut off and the hot flow would be opened and the process would repeat. The flow control may be accomplished such that in a range of rotation from point 7b to point 7a the hot flow is gradually reduced and cold flow gradually increased and in a range of rotation from point 9b to point 9a the cold flow is gradually reduced and the hot flow is gradually increased in anticipation of the rotation reversal.

Figure 2A:
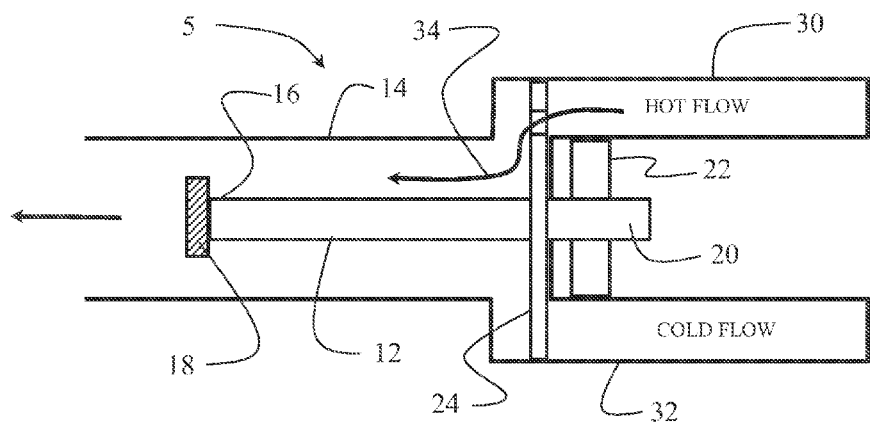
FIG. 2A is a block diagram of a first embodiment demonstrating hot flow actuation.
Figure 2B:
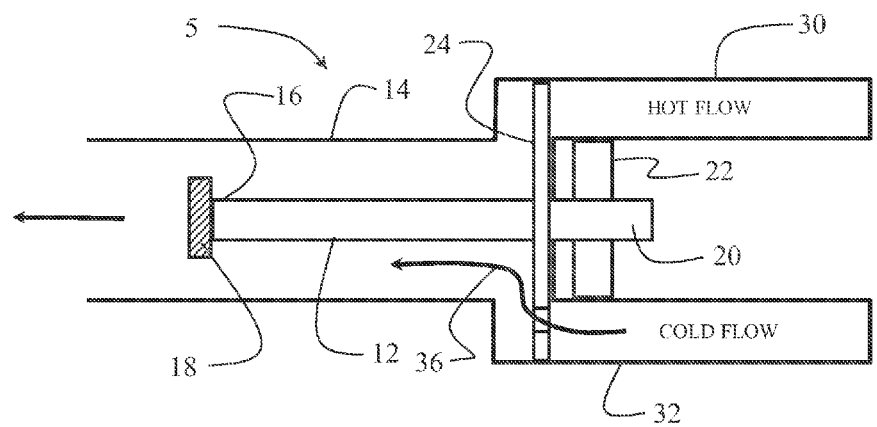
FIG. 2B is the block diagram of the embodiment of FIG. 2A demonstrating cold flow actuation.

A first exemplary embodiment the SMA rotary motion generator 5 of the thermal energy harvesting system 10 is shown in notional form in FIGS. 2A and 2B. A SMA tube 12 is supported for fluid contact within a flow casing 14 with a fixed end 16 rigidly constrained at an end cap 18. A rotating end 20 of the tube 12 is supported in a bearing 22 and provides a rotating output that may be connected to a gearbox and generator/alternator, as will be described in greater detail subsequently. A flow routing device such as a baffle plate 24, to be described in greater detail subsequently, is connected to or driven by the tube 12 and incorporates a hot aperture 26 and a cold aperture 28 which alternately align with a hot flow conduit 30 receiving hot gas from the ECS or other source and a cold flow conduit 32 receiving cold gas from the ECS or other source. A seen in FIG. 2A, flow of hot gas, as represented by arrow 34, from the hot flow conduit 30 through the hot aperture 26 in the baffle plate 24 and through the flow casing 14 heats the tube 12 resulting in rotation of the tube in a first direction. Rotation of the tube displaces the hot aperture 26 from the hot flow conduit 30 interrupting the flow from the hot flow conduit and opens the cold aperture 30, as seen in FIG. 2B, introducing cold gas flow, as represented by arrow 36, from the cold flow conduit 32 through cold aperture 30 resulting in rotation of the tube 12 in an opposite direction, closing the cold aperture 28 to interrupt flow from the cold flow conduit and reopening the hot aperture 26. The process then repeats.

Figures 3A, 3B:
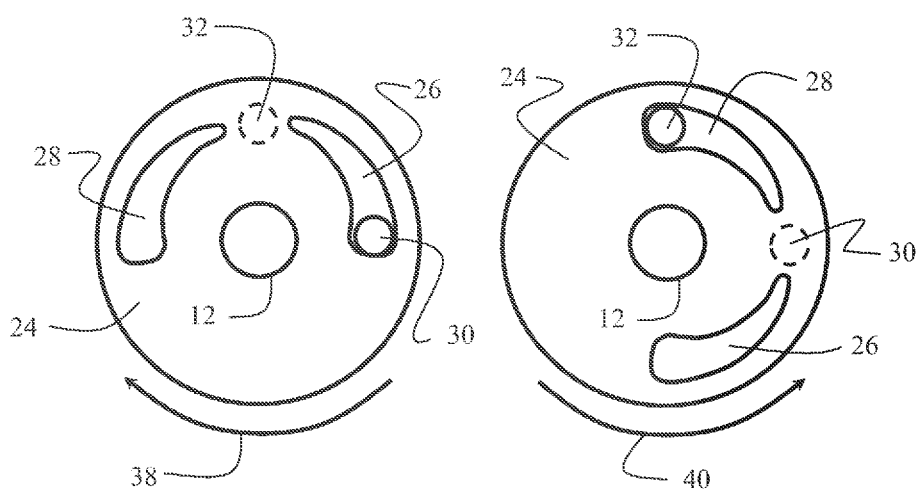
FIG. 3A is an exemplary baffle plate for use in the first embodiment showing hot flow positioning.
FIG. 3B is the baffle plate of FIG. 3A fully rotated for cold flow.

The hot and cold apertures 26, 28 may be shaped to provide a flow and temperature profile of gas flow to the tube 12 for desired rotational speed. As seen in FIGS. 3A and 3B, the apertures have a reducing area as the tube 12 rotates from a maximum flow to a reduced flow prior to cutoff. As seen in FIG. 3A for an initial position, the full diameter of hot flow conduit 30 is exposed in hot aperture 26 providing the greatest hot gas flow for initiating rotation of the tube 12 in the heating direction as shown by arrow 38. The cold flow conduit 32 is closed by the baffle plate 24. As the tube 12 and concentrically attached baffle 24 rotate in the heating direction, the area exposed by the hot aperture 26 reduces to a cutoff point. Simultaneously the cold aperture 28 opens and exposes the cold flow conduit 32 with increasing area. As the tube 12 reaches a maximum rotation as seen in FIG. 3B, the diameter of the cold flow conduit 32 is fully exposed through the cold aperture 28 and the hot flow conduit 30 is blocked by the baffle plate 24 reversing the rotation of the tube 12 to a cooling direction as shown by arrow 40. As the tube 12 and concentrically attached baffle 24 rotate in the cooling direction, the area exposed by the cold aperture 28 reduces to a cutoff point. As in the prior rotation direction, simultaneously, the hot aperture 26 opens and exposes the hot flow conduit 30 with increasing area. Alternating rotation of the tube 12 is maintained as long as hot and cold gas flow is available through the hot and cold flow conduits.

Figure 4:
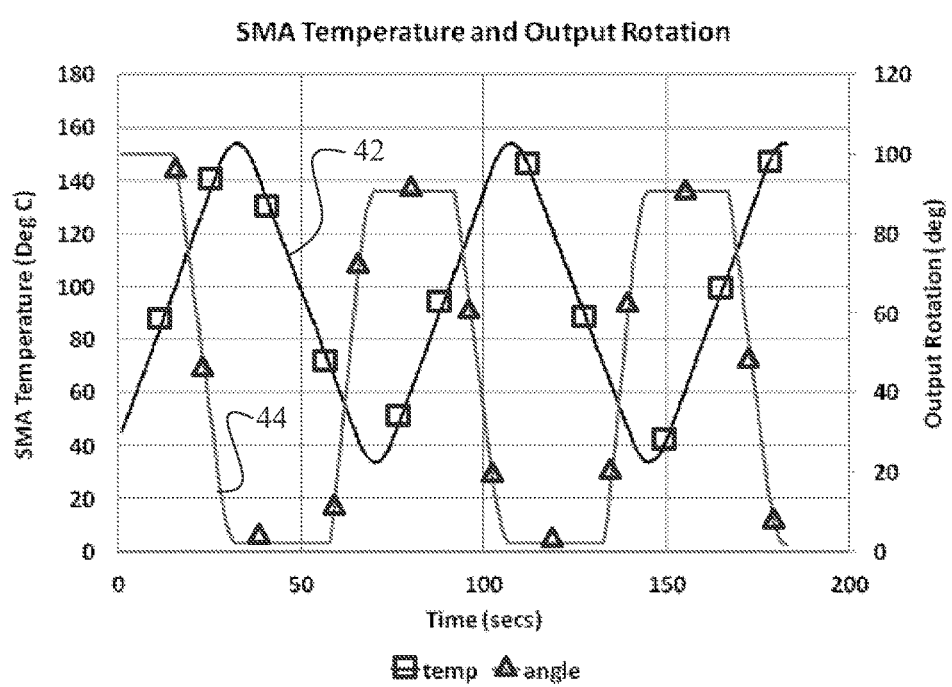
FIG. 4 is a graphic representation of SMA tube temperature and output rotation for the first embodiment.

The resulting sequence of heating and cooling with resulting rotational motion is shown in FIG. 4 with temperature of the tube 12 induced by the hot and cold flows is shown by trace 42 and rotational angle of the tube 12 is shown in trace 44. The point and which the flow around the SMA tube 12 transitions from hot to cold or cold to hot, how quickly it transitions, and the volume of flow can all be controlled by the pattern of apertures 26,28 in the baffle plate 24.

Figure 5A:
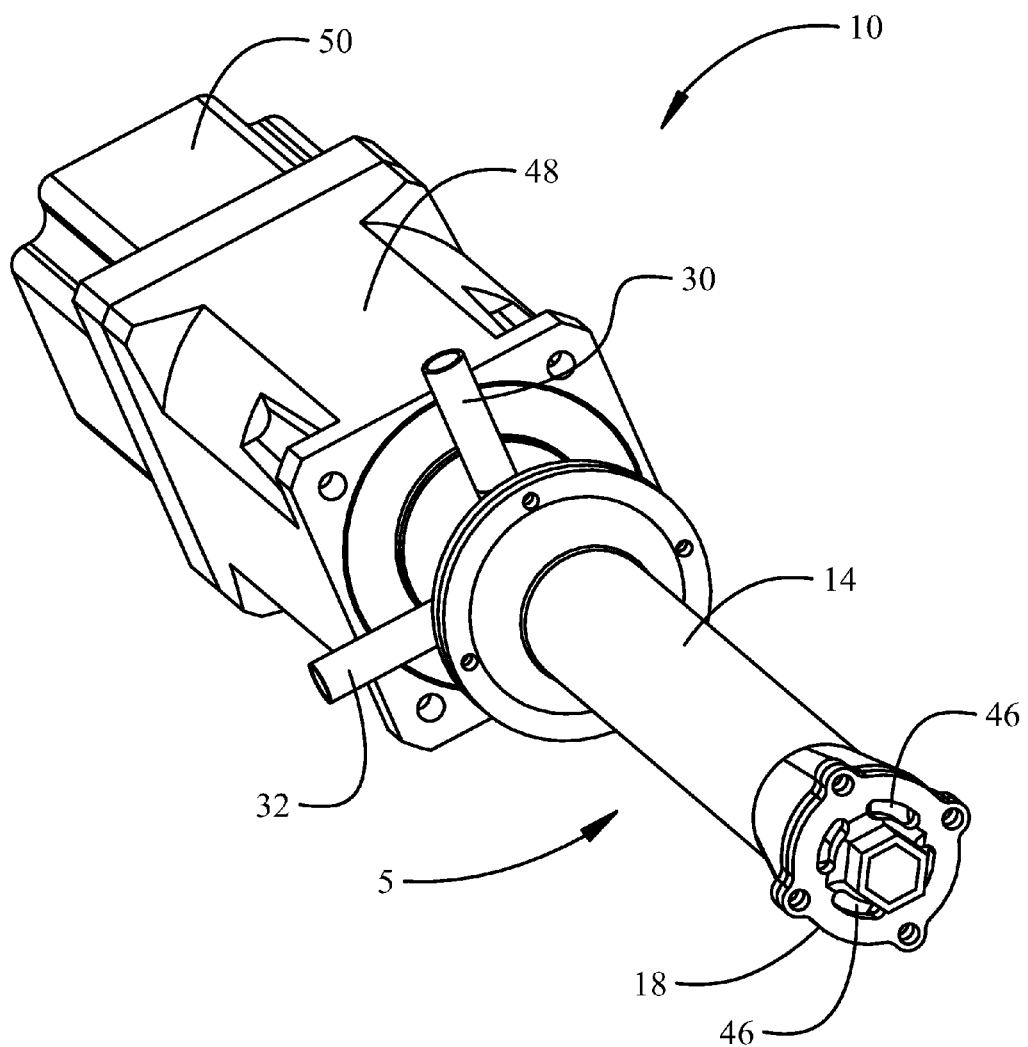
FIG. 5A is an exemplary pictorial representation of the first embodiment.
Figure 5B:
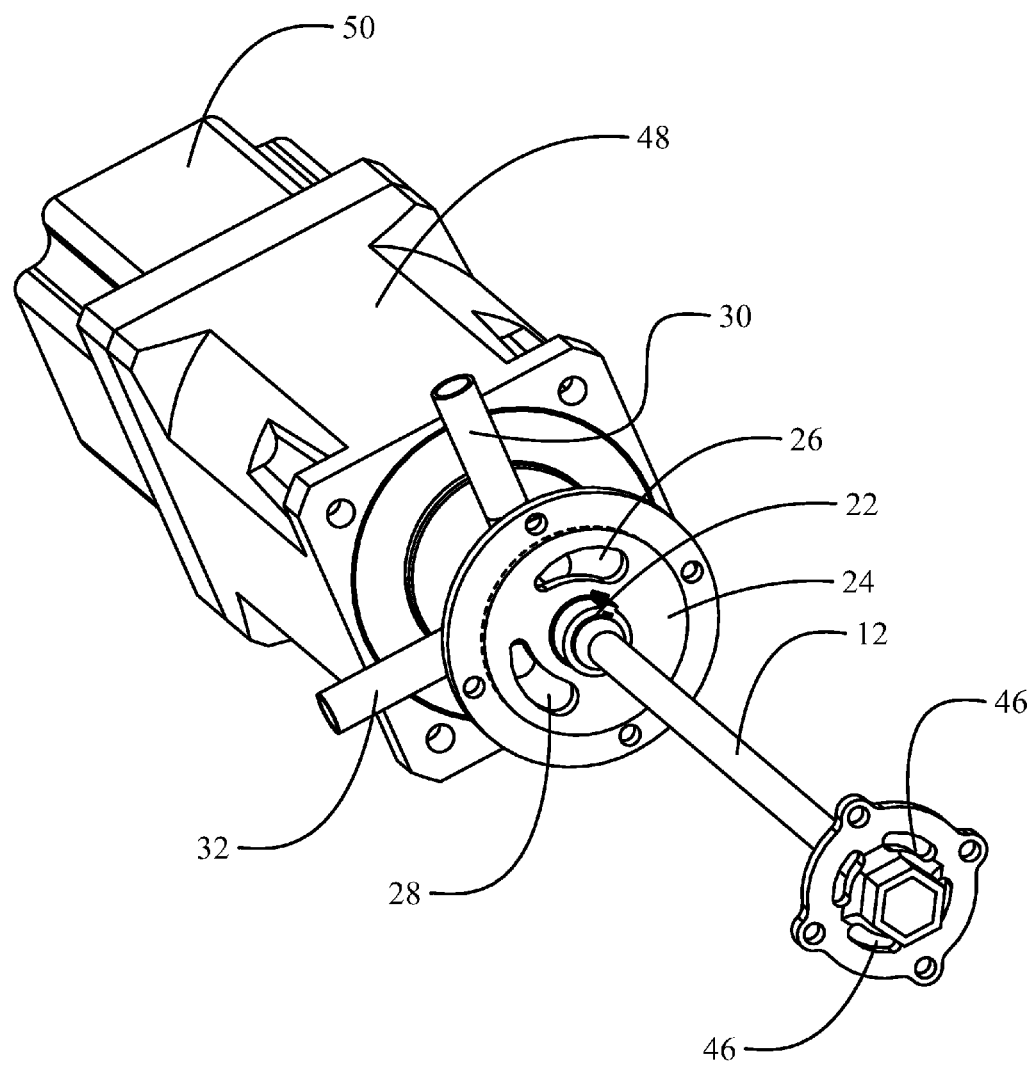
FIG. 5B is a pictorial representation of the first embodiment with the flow casing removed to expose the SMA tube and baffle.

An exemplary physical implementation of the thermal energy harvesting system 10 employing first embodiment of the SMA rotary motion generator is shown in FIGS. 5A and 5B. The flow casing 14, seen in FIG. 5A, houses the tube 12, seen in FIG. 5B. The end cap 18 constrains the tube 12 at the first end 16 and is attached to the flow casing 14. Exhaust apertures 46 in the end cap 18 allow the flow of gas to exit the flow casing 14. The rotating end of the tube 12 extends through the bearing 22 and is attached through a gear box 48 to a generator or alternator 50 to produce electrical power. The gear box 48 may include ratchets or other rotational direction conversion systems to provide single directional rotation from the gear box to the generator/alternator.

Figure 6A:
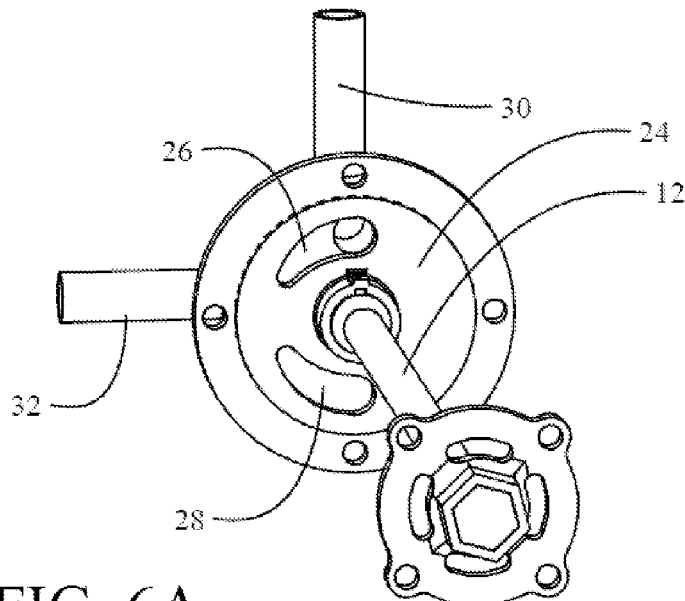
FIGS. 6A-6D show various rotation points of the SMA tube and baffle during operation.
Figure 6B:
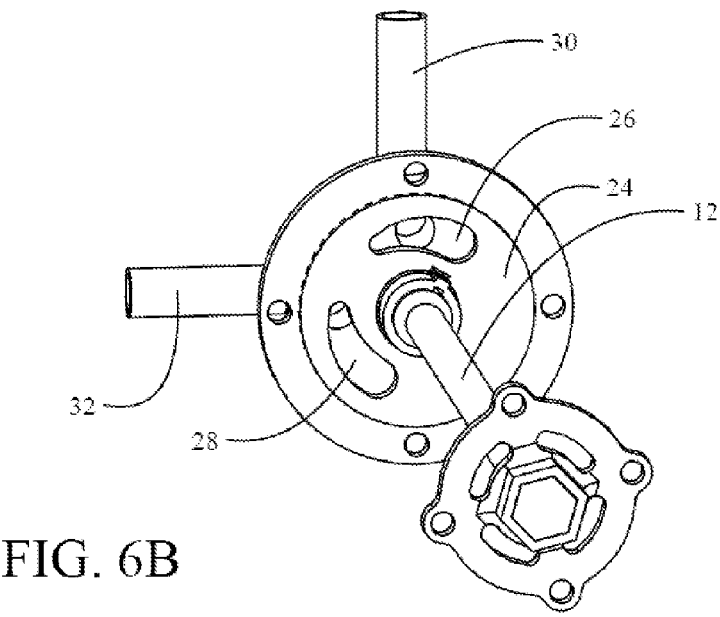
Figure 6C:
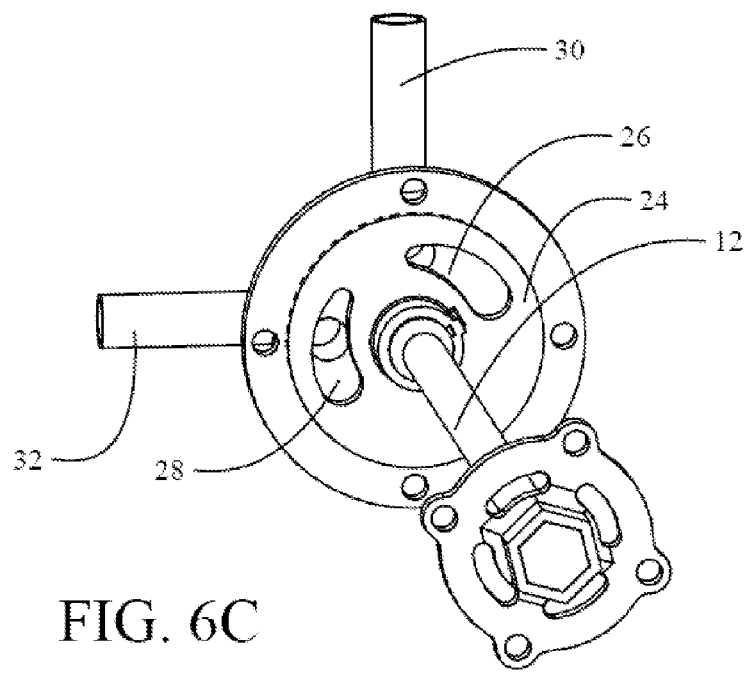
Figure 6D:
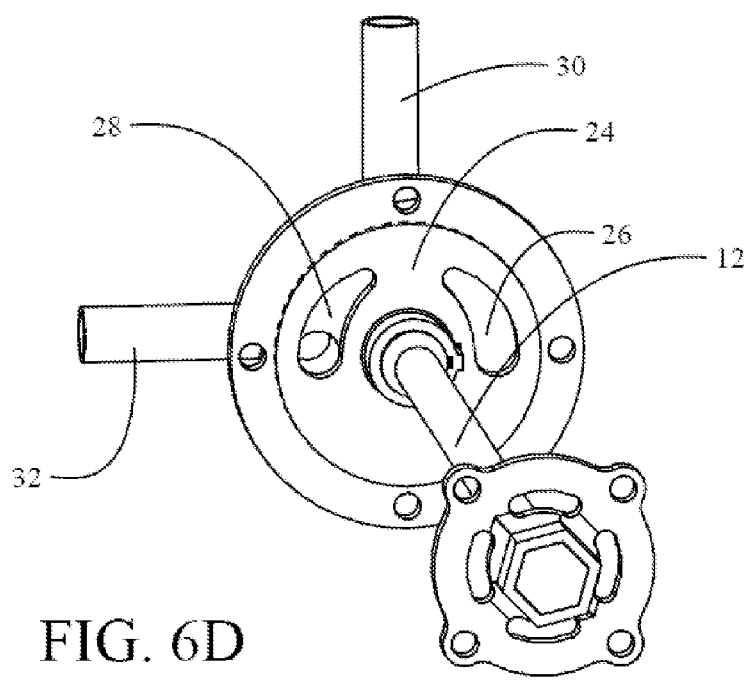

The rotational sequence of the baffle plate 24 described with respect to FIGS. 3A and 3B is shown in detail for the physical implementation in FIGS. 6A-6D. As seen in FIG. 6A, with the tube 12 in an initial position, the hot aperture 26 fully exposes the hot flow conduit 30 and blocks the cold flow conduit 32. Hot gas flows from the hot flow conduit through the flow casing heating the SMA tube causing it to rotate in a first direction (clockwise for the example in the drawings). As the tube 12 and baffle plate 24 rotate the profile of the hot aperture progressively restricts the area of the hot flow conduit 30 and the cold flow conduit 32 is exposed by the cold aperture 28 with a reduced area as seen in FIG. 6B. Further rotation of the tube 12 and baffle plate 24 as seen in FIG. 6C causes the hot aperture 26 to further reduce the area of the hot flow conduit 30 while the cold aperture 28 is increasing the area of the cold flow conduit 32. Finally at full rotation, approximately 90° for the exemplary embodiment, the cold aperture 28 exposes the entire area of the cold flow conduit 32 while the baffle plate 24 has closed the hot flow conduit 30. The flow of cold gas from the cold flow conduit 32 through cold aperture 28 reverses the rotation of the tube 12 reversing the sequence of cold and hot gas exposure in the flow casing 24. While shown in the drawings of the exemplary embodiment as concentric to and directly connected to the tube, the baffle plate may be driven by a gear train operably connected to the tube with appropriate conduits for routing the hot and cold flows into the flow casing.

Figure 7A:
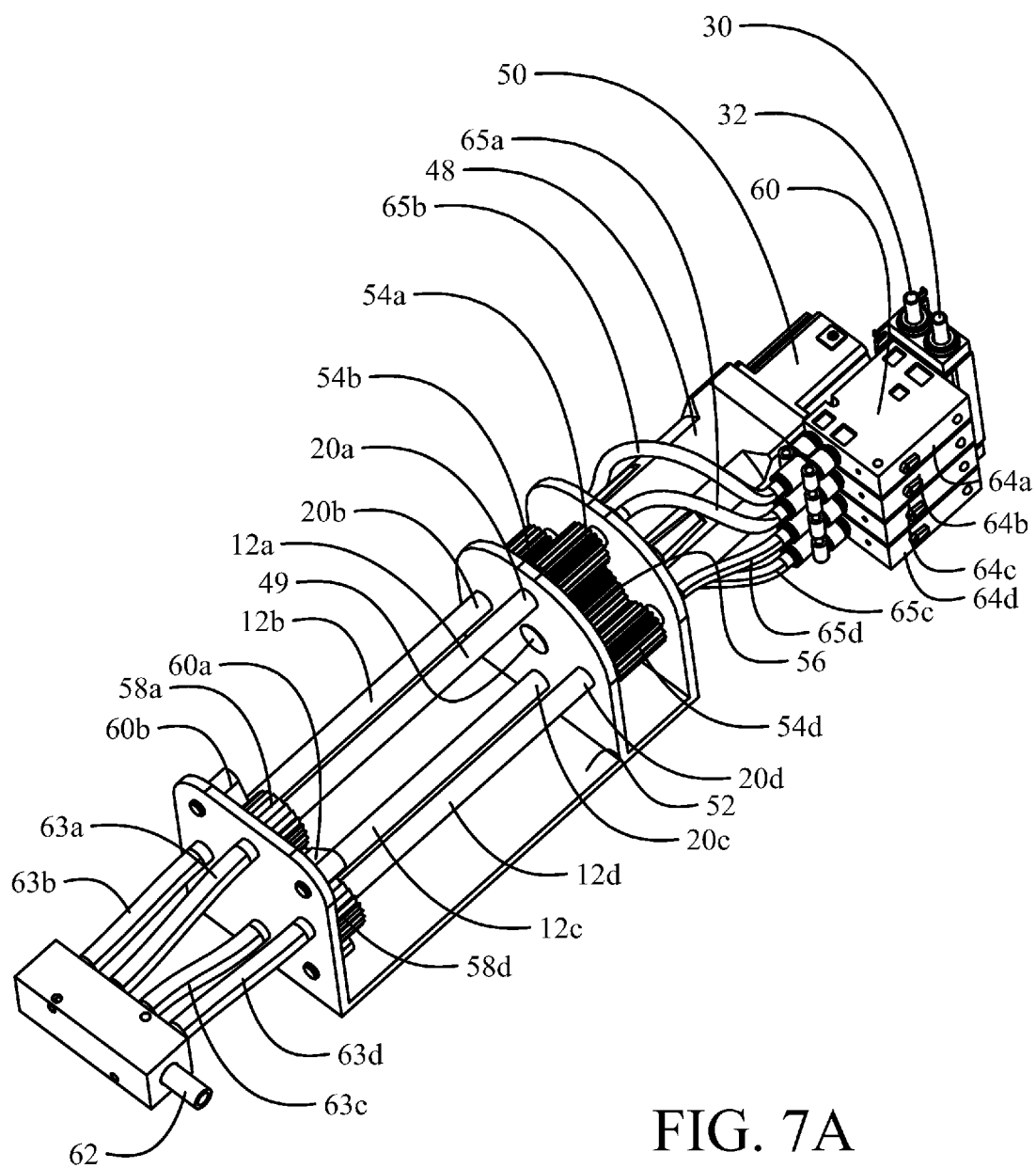
FIG. 7A is a pictorial representation of a second embodiment with multiple SMA tubes having ratchets and gearing for continuous single direction output rotation.
Figure 7B:
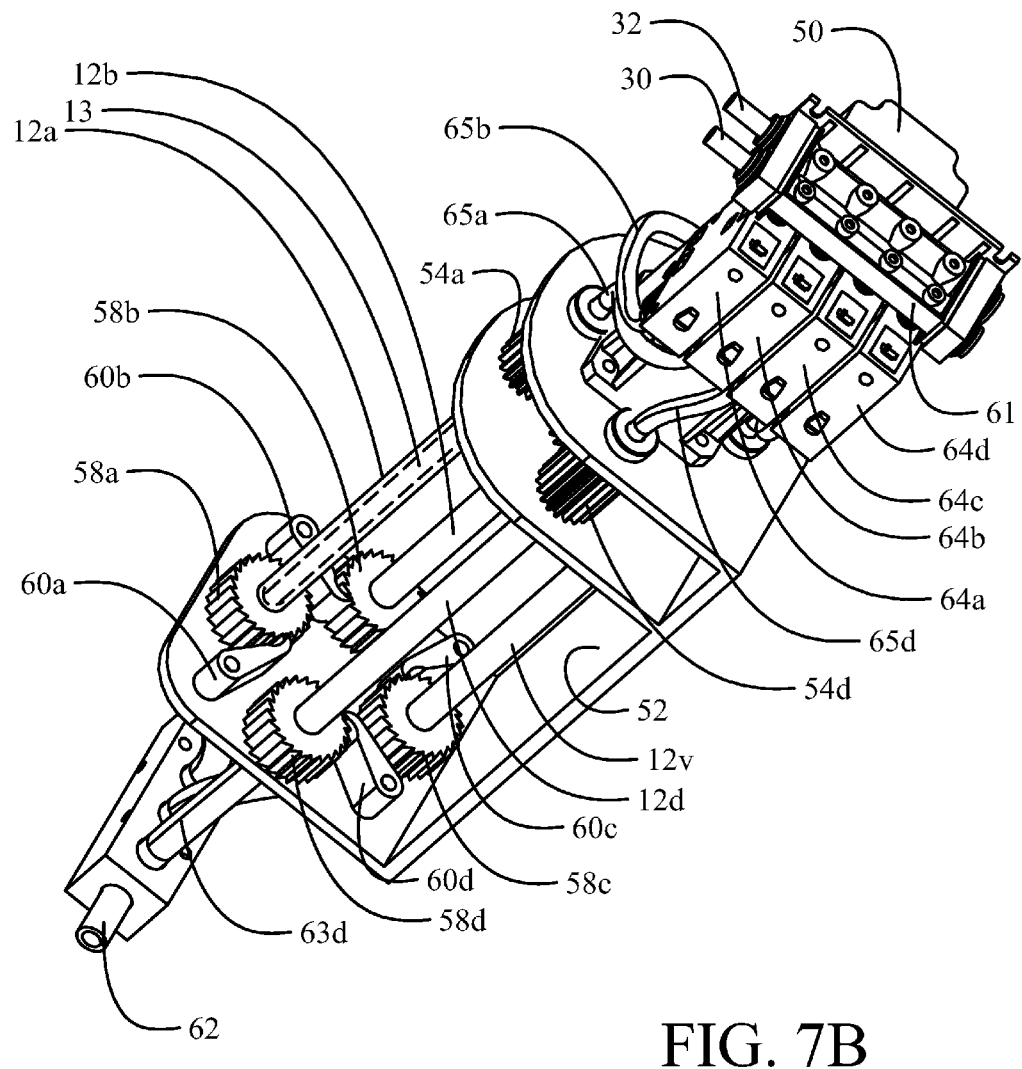
FIG. 7B is a reverse pictorial representation of the second embodiment showing the features of the ratchets.

A continuous output rotation in a single direction for driving a generator/alternator is achieved in a second embodiment as shown in FIGS. 7A and 7B. A plurality of SMA tubes, four tubes 12a, 12b, 12c and 12d for the exemplary embodiment shown in the drawings, are supported in a frame 52. Rotation of each tube drives a gear 54a, 54b, 54c and 54d which, in turn drives a central drive gear 56. The first end 16a, 16b, 16c and 16d of each tube is fixed to a ratchet gear 58a, 58b, 58c and 58d constrained against reverse rotation by a ratchet pawl 60a, 60b. 60c and 60d. The hot flow conduit 30 and cold flow conduit 32 are routed through a manifold 61 which incorporates a solenoid valve 64a. 64b, 64c and 64d for each tube controlling flow into a respective inlet conduit 65a, 65b, 65c and 65d. A central bore 13 (shown in phantom for example in tube 12a) in each SMA tube provides a flow casing connected to the respective inlet conduit to provide gas flow to heat and cool each SMA tube 12a, 12b, 12c and 12d. The gas exhausted from the tubes flows into an exhaust manifold 62 through outlet conduits 63a, 63b, 63c and 63d. While the flow casing is shown as the internal bore of the tubes for the exemplary embodiment, an external flow casing surrounding each tube and interconnected to the inlet and outlet conduits may be employed in alternative embodiments.

Figure 7C:
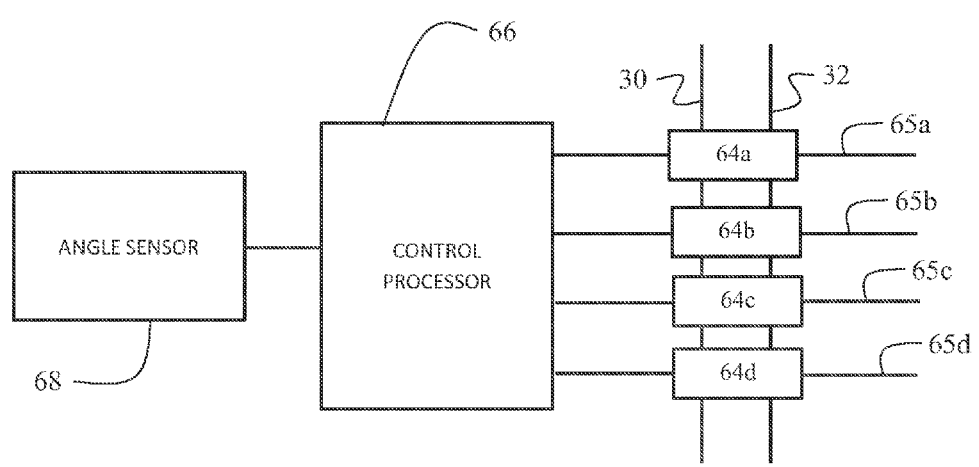
FIG. 7C is a block diagram of a control system for the second embodiment.

Each of the solenoid valves 64a, 64b, 64c and 64d provides three positions, a cold flow position in which the cold flow conduit 32 is connected to the respective inlet conduit 65a, 65b, 65c or 65d, a hot flow position in which the hot flow conduit 30 is connected to the respective inlet conduit 65a, 65b, 65c or 65d, and a closed or off position in which no flow is provided through the valve. In the example usage in association with an aircraft ECS, the hot and cold flows may be hot bypass air from the engines or APU and cold free stream air. Hot and cold liquid flow sources may also be used in alternative embodiments. As seen in FIG. 7C, a control processor 66 receives an angle position output from an angle sensor 68 adapted to determine the angle of the output shaft 49. The processor 66 provides an output to sequentially control the solenoid valves 64a, 64b, 64c and 64d to heat or cool or block flow to the associated SMA tubes 12a, 12b, 12c and 12d to allow a continuous rotation of the output shaft 49. In advanced systems, the solenoid valves may also provide a range of flow for each of the hot flow position and cold flow position and control system may be adapted to alter the hot and cold flows, similar to the effect of profiling the hot and cold apertures in the first embodiment, for maintaining constant rotation rates consistent with the characteristics of the SMA tubes.

Operation of each of the tubes shown in FIGS. 7A and 7B under control of the processor 66 is represented in FIGS. 8A-8D. Each SMA tube is trained in a twist direction. Using tube 12a as an example, with the tube at a base temperature as shown in FIG. 8A, first end 16a is constrained by ratchet gear 58a and pawl 60a as represented by blocked arrow 69. Upon heating of the tube 12a as shown in FIG. 8B, the tube twists through second end 20a in the twist direction driving gear 54a in a first rotational direction represented by arrows 70. A rotation of second end 20a of 90° represented by twist line 34a is shown as an example. Ratchet gear 58a maintains the constraint on first end 16a resulting in the twist or rotation being induced at the second end 20a. Cooling of tube 12a as represented in FIG. 8C results in gear 54a constraining second end 20a as represented by blocked arrow 71 while first end 16a rotates opposite to the constraining direction of ratchet 58a as represented by arrow 72. Upon completion of the cooling of tube 12a, first end 16a has assumed a new zero position as represented by twist line 34a and is again constrained by the ratchet 58a as shown in FIG. 8D.

As shown in FIGS. 7A and 7B four SMA tubes 12a, 12b, 12c and 12d each constrained at a first end 16a, 16b, 16c and 16d by a ratchet 58a, 58b, 58c and 58d are employed. A cover (not shown) may be employed to enclose the tubes as a self-contained unit. The second end 22a, 22b, 22c and 22d of each SMA tube 12a, 12b, 12c and 12d is connected to a gear 54a, 54b, 54c and 54d. The gears 54a, 54b, 54c and 54d drive the output gear 56 attached to rotary output shaft 49 integrated in a gear box 48 which in turn drives the generator/alternator 50.

Figure 9:
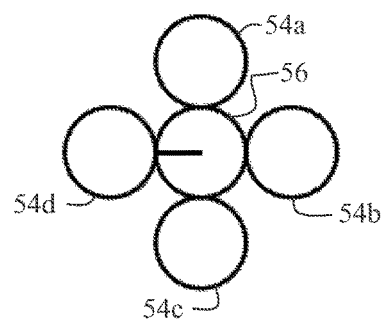
FIG. 9 shows an operational depiction the four actuator tubes of the second embodiment.
Figure 10:
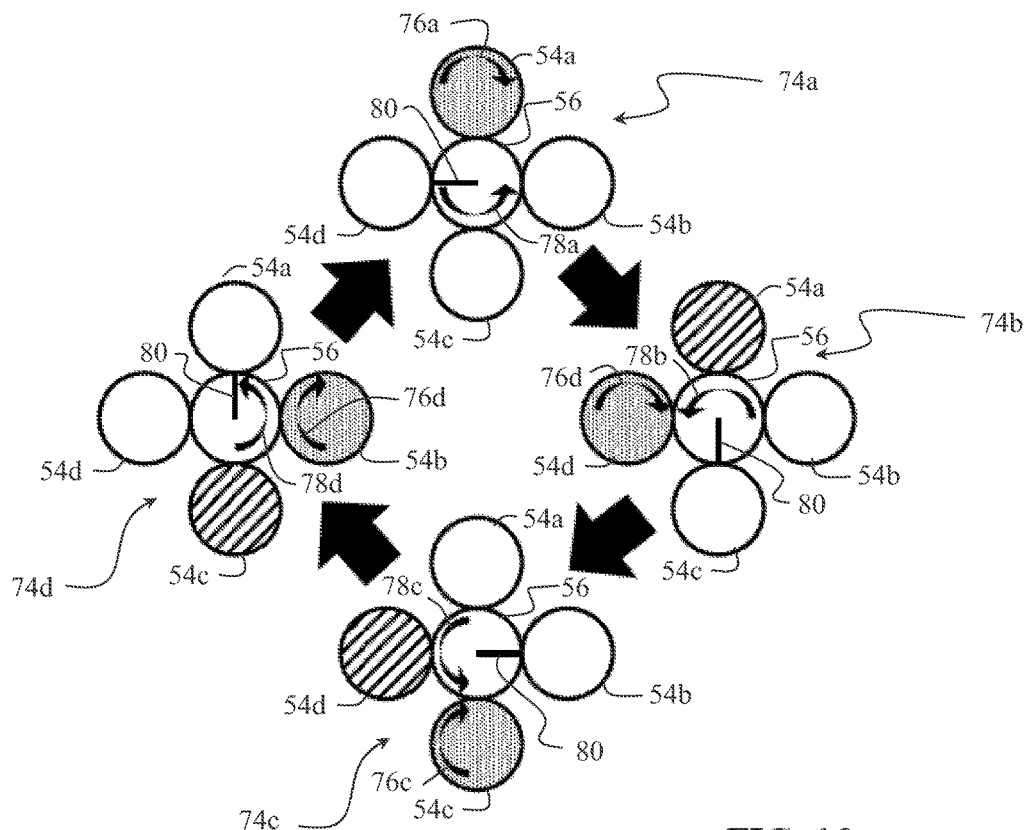
FIG. 10 shows a sequence of operation by the four actuator tubes to provide constant rotary motion.

Operation of the tubes 12a, 12b, 12c and 12d is represented in FIGS. 9 and 10. As seen in FIG. 9 with reference to elements as shown in FIGS. 7A and 7B, in an initial state at a base temperature, gears 54a, 54b, 54c and 54d engage drive gear 56 at a first rotational position represented by index 80. Continuous rotation of the drive gear 56 is achieved by sequential heating of the SMA tubes. Any desired sequence may be employed but an example is shown in FIG. 10. In a first rotation sequence 74a, tube 12a is heated (represented by stipling of the gear in the drawing) by transitioning solenoid 64a for flow from the hot flow conduit 30 resulting in rotation of gear 54a as represented by arrow 76a (the first end 14a of tube 12a being constrained by ratchet gear 58a) which rotates drive gear 56 as represented by arrow 78a. Tubes 12b, 12c and 12d remain at the base temperature and have a rigid body rotation with gears 54b, 54c and 54d which freely rotate with drive gear 56. At the completion of the first rotation sequence, tube 12a is cooled (represented by cross hatching of the gear in the drawing) by transitioning solenoid 64a to the cold flow conduit 32 and tube 12d is heated by transitioning solenoid valve 64d for flow from the hot flow conduit 30 as shown in second rotation sequence 74b (the first end 16d of tube 12d constrained by ratchet gear 58d). Gear 54d driven by tube 12d rotates as represented by arrow 76d which continues the rotation of drive gear 56 as represented by arrow 68b. Tubes 12b and 12c remain at the base state and operate in rigid body rotation with gears 54b and 54c. Tube 12a, cooling with first end 16a freely rotating with ratchet gear 58a and constrained by gear 54a which rotates with drive gear 56, returns to the base state. The sequence of continuous rotation is propagated as shown in third rotation sequence 74c where tube 12c is now heated by transitioning solenoid 64c for flow from the hot flow conduit 30 resulting in rotation of gear 44c as represented by arrow 76c (the first end 16c of tube 12c being constrained by ratchet gear 58c) which rotates drive gear 56 as represented by arrow 78c. Tube 12d is cooling by transitioning solenoid 64d for flow from the cold flow conduit 32 with first end 16d freely rotating in ratchet gear 58d and constrained by gear 54d which rotates with drive gear 56, returning to the base state. Tubes 12a has now returned to the base state and tube 12b remains at the base state with both tubes operating in rigid body rotation with gears 54a and 54c At the completion of the third rotation sequence, tube 12c is allowed to begin cooling by transitioning solenoid 64c for flow from the cold flow conduit 30 and tube 12b is heated by transitioning solenoid 64b for flow from the hot flow conduit 30 as shown in fourth rotation sequence 74d (the first end 16b of tube 12b constrained by ratchet gear 58c). Gear 54b driven by tube 12b rotates as represented by arrow 76b which continues the rotation of drive gear 56 as represented by arrow 78d. Tube 12b, cooling with first end 16b freely rotating with gear 16b and constrained by gear 54b which rotates with drive gear 56, returns to the base state. Tube 12d has now returned to the base state and with tube 12a in the base state both tubes rotate with gears 54d and 54a in a rigid body rotation with drive gear 56 and first ends 16d and 16a freely rotating with ratchet gears 60d and 60a. Rotation of the drive gear 56 through the various rotation sequences can be seen by the rotation of index 80 and the repetition of the sequences described with respect to FIG. 10 allows continuous rotary motion of the drive gear. While four SMA tubes are shown, any desired number of two or more tubes may be employed. Additionally, while described herein as employing ratchet gears 58a, 58b. 58c and 58d with pawls 60a, 60b, 60c and 60d to provide selected directional motion of the SMA tubes, the first ends 16a, 16b, 16c and 16d of the tubes may be fixed as in the initial embodiment and a sprag gear substituted for each of the gears 54a, 54b, 54c and 54d attached to the second ends 20a, 20b, 20c and 20d of the tubes.

Figure 11:
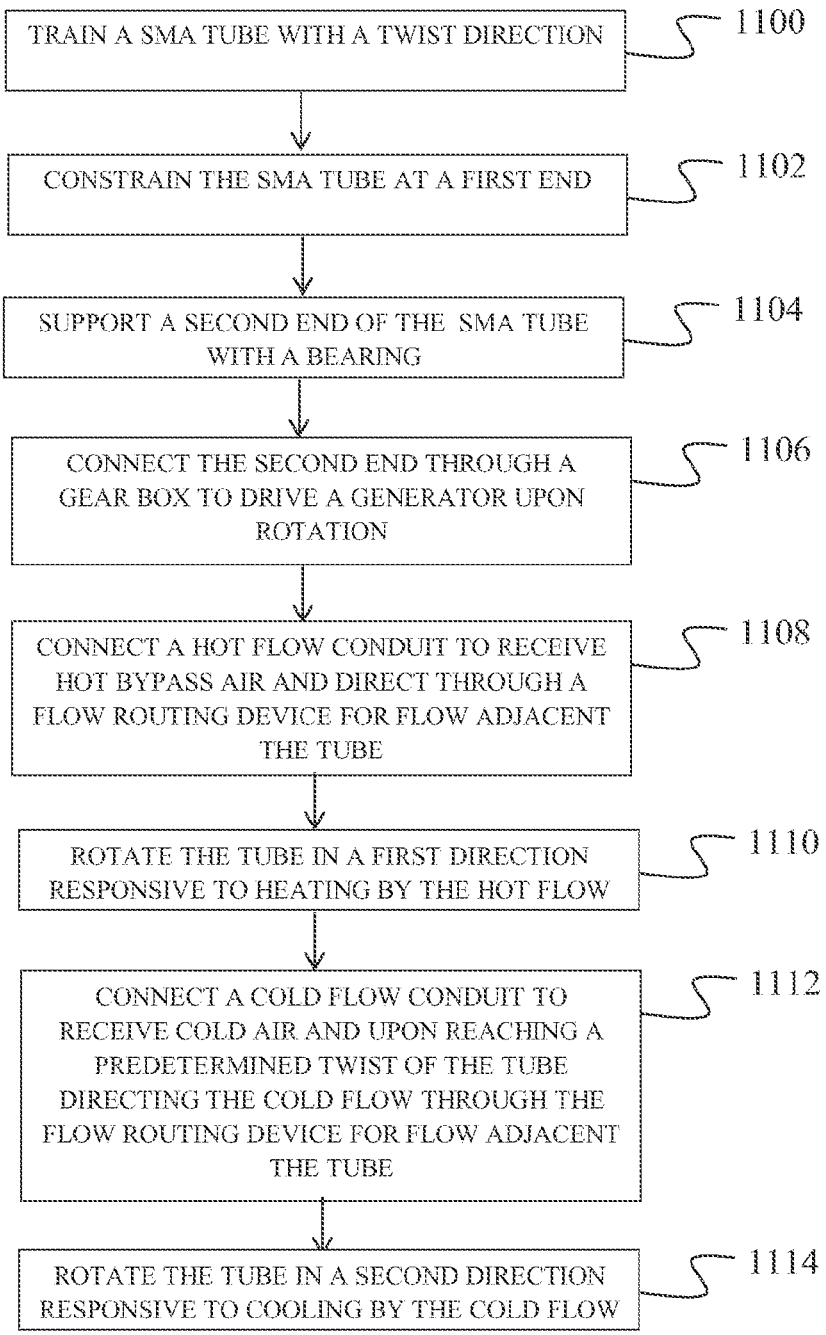
FIG. 11 is a flow chart of a method for rotary actuation employing the first embodiment as disclosed herein; and, FIG. 12 is a flow chart of a method for rotary actuation employing the second embodiment as disclosed herein.

The first embodiment disclosed herein allows a method of thermal energy harvesting using SMA rotary actuation as depicted in FIG. 11. A SMA tube is trained with a twist direction, step 1100, and constrained at a first end, step 1102. A second end of the SMA tube is supported by a bearing, step 1104, and rotation of the second end drives a generator/alternator through a gear box, step 1106. A hot flow conduit is connected to receive hot bypass air from an ECS and a flow routing device such as a baffle plate with apertures connects for flow adjacent the tube, step 1108. The tube rotates in a first direction responsive to heating by the hot flow, step 1110. A cold flow conduit is connected to receive cold air from the ECS and upon reaching a predetermined twist in the tube, the flow routing device connects the cold flow conduit for flow adjacent the tube, step 1112, and the tube rotates in a second direction responsive to cooling by the cold flow, step 1114.

Figure 12:
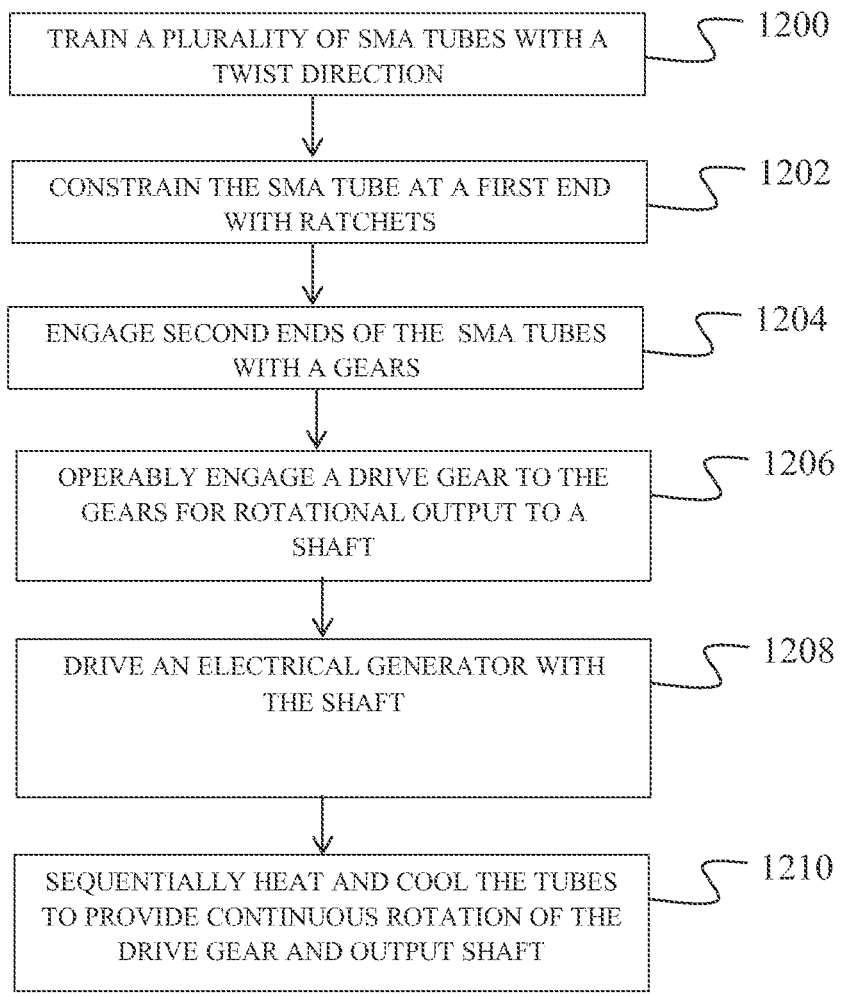

The second embodiment disclosed herein allows a method of thermal energy harvesting using SMA rotary actuation with continuous rotation in a single direction as depicted in FIG. 12. A plurality of SMA tubes are trained with a twist direction, step 1200, and constrained at first ends with ratchets, step 1202. Second ends of the SMA tubes are engaged by gears, step 1204. A drive gear is operably engaged by the gears for rotational output to a shaft, step 1206, and an electrical generator/alternator is driven by the shaft, step 1208. Sequential heating and cooling of the tubes in the plurality is accomplished to provide continuous rotation of the drive gear and output shaft, step 1210.

Having now described various embodiments of the disclosure in detail as required by the patent statutes, those skilled in the art will recognize modifications and substitutions to the specific embodiments disclosed herein. Such modifications are within the scope and intent of the present disclosure as defined in the following claims.

What is claimed is:

1. A thermal energy harvesting system comprising:
a hot flow conduit;
a cold flow conduit;
a flow routing device interruptibly interconnecting the hot flow conduit and cold flow conduit with a flow casing;
at least one shape memory actuator (SMA) tube in fluid contact with the flow casing, said at least one SMA tube trained for relative rotation along a longitudinal axis of the flow casing responsive to temperature change and fixed at a first end, said flow routing device sequentially supplying hot flow from the hot flow conduit and cold flow from the cold flow conduit inducing rotation of the at least one SMA tube at a second end; and,
a generator or alternator operably connected to the second end of the at least one SMA tube.

2. A thermal energy harvesting system comprising:
a hot flow conduit;
a cold flow conduit;
a flow routing device interruptibly interconnecting the hot flow conduit and cold flow conduit with a flow casing;
at least one shape memory actuator (SMA) tube in fluid contact with the flow casing and fixed at a first end, said flow routing device sequentially supplying hot flow from the hot flow conduit and cold flow from the cold flow conduit inducing rotation of the at least one SMA tube at a second end;
wherein the at least one SMA tube is carried in the flow casing and the flow routing device comprises a baffle plate operably connected to the SMA tube and having a hot aperture rotatably aligned with the hot flow conduit and a cold aperture rotatably aligned with the cold flow conduit, said hot aperture and cold aperture introducing flow into the flow casing; and,
a generator or alternator operably connected to the second end of the at least one SMA tube.

3. The thermal energy harvesting system as defined in claim 2 wherein the hot aperture and cold aperture are shaped with a reducing area as the at least one SMA tube rotates from a maximum flow to a reduced flow prior to cutoff to provide a flow and temperature profile of gas flow into the flow casing.

4. The thermal energy harvesting system as defined in claim 3 wherein a profile of the hot aperture progressively restricts an area of the hot flow conduit with rotation of the baffle plate in a first direction and a profile of the cold aperture progressively restricts an area of the cold flow conduit with rotation of the baffle plate in a second direction.

5. The thermal energy harvesting system as defined in claim 2 wherein the hot flow conduit is operably connected to hot bypass airflow from an engine or auxiliary power unit.

6. A thermal energy harvesting system comprising:
a hot flow conduit;

a cold flow conduit operably connected to an air free stream;

a flow routing device interruptibly interconnecting the hot flow conduit and cold flow conduit with a flow casing;

at least one shape memory actuator (SMA) tube in fluid contact with the flow casing and fixed at a first end, said flow routing device sequentially supplying hot flow from the hot flow conduit and cold flow from the cold flow conduit inducing rotation of the at least one SMA tube at a second end; and, a generator or alternator operably connected to the second end of the at least one SMA tube.

7. The thermal energy harvesting system as defined in claim 6 wherein the hot flow conduit is operably connected to hot bypass airflow from an engine or auxiliary power unit through an environmental control system (ECS) of an aircraft and the cold flow conduit is operably connect to an air free stream through the ECS.

8. The thermal energy harvesting system as defined in claim 6 wherein the at least one SMA tube comprises a plurality of SMA tubes wherein the plurality of tubes are arranged in parallel and have a common twist direction, said plurality of tubes constrained in the twist direction at a first end and further comprising:

a drive gear operably engaged to a second end of each of said plurality of SMA tubes, said second end freely rotating in said twist direction; and, an output shaft connected to the drive gear as the common output, said output shaft operably connected to the generator or alternator.

9. The thermal energy harvesting system as defined in claim 8 further comprising an associated ratchet engaged to the first end of each of said plurality of SMA tubes, each ratchet constraining the first end in an opposite direction to the twist direction and freely rotating in said twist direction.

10. The thermal energy harvesting system as defined in claim 8 further comprising an associated sprag gear engaged to the second end of each of said plurality of tubes, said sprag gear engaged to the drive gear and operating in the twist direction.

11. The thermal energy harvesting system 8 wherein the flow routing device comprises:

a manifold connected to the hot flow conduit and cold flow conduit;

a plurality of valves equal in number to the plurality of SMA tubes and associated therewith, each of said plurality of valves connected to the manifold and operable for interruptible fluid communication with the hot flow conduit or cold flow conduit;

a plurality of inlet conduits each interconnecting an associated one of the plurality of valves with a central bore in an associated one of the plurality of SMA tubes as the flow casing;

a plurality of outlet conduits, each outlet conduit interconnecting the central bore of an associated one of the SMA tubes to an outlet manifold; and, a controller operably connected to the plurality of valves and adapted to sequentially control each of said valves to supply hot flow from the hot flow conduit and cold flow from the cold flow conduit.

12. The thermal energy harvesting system as defined in claim 11 further comprising a gear box interconnecting the output shaft to the generator or alternator.

13. A method for thermal energy harvesting comprising:

training a at least one shape memory actuator (SMA) tube with a twist direction;

constraining the at least one SMA tube at a first end;

supporting a second end of the at least one SMA tube with a bearing;

connecting a hot flow conduit with a flow routing device for flow adjacent the tube;

rotating the tube in a first direction responsive to heating by the hot flow thereby rotating the second end to drive a generator/alternator through a gear box;

upon reaching a predetermined twist in the tube, connecting a cold flow conduit through the flow routing device for flow adjacent the tube; and rotating the tube in a second direction responsive to cooling by the cold flow.

14. The method as defined in claim 13 wherein the flow routing device comprises a baffle plate having a hot aperture for rotational alignment with the hot flow conduit and the step of connecting a hot flow conduit comprises rotating the baffle plate for interruptible alignment hot aperture with the hot flow conduit.

15. The method as defined in claim 13 wherein the flow routing device comprises a baffle plate having a cold aperture for rotational alignment with the cold flow conduit and the step of connecting a cold flow conduit comprises rotating the baffle plate for interruptible alignment cold aperture with the cold flow conduit.

16. The method as defined in claim 13 further comprising connecting the hot flow conduit to an environmental control system (ECS) to receive hot bypass air.

17. The method as defined in claim 13 further comprising connecting the cold flow conduit to an ECS to receive cold air.

18. The method as defined in claim 13 wherein the at least one SMA tube comprises a plurality of SMA tubes and the step of training the SMA tube with a twist direction comprises training a plurality SMA tubes with a twist direction;

the step of constraining a first end of the at least one SMA tube comprises constraining each of the plurality of SMA tubes at a first end with ratchets;

and further comprising engaging second ends of the plurality of SMA tubes for rotational output of a shaft; and, sequentially heating the plurality of tubes to provide continuous rotation of the output shaft to drive a generator or alternator.

\* \* \* \* \*